(12) United States Patent
Enami et al.

(10) Patent No.: US 10,381,873 B2
(45) Date of Patent: Aug. 13, 2019

(54) TERMINAL DEVICE AND WIRELESS POWER FEEDING SYSTEM

(71) Applicant: DENSO CORPORATION, Kariya, Aichi-pref. (JP)

(72) Inventors: Tatsuya Enami, Kariya (JP); Hironobu Akita, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 15/562,050

(22) PCT Filed: Mar. 28, 2016

(86) PCT No.: PCT/JP2016/001783
§ 371 (c)(1),
(2) Date: Sep. 27, 2017

(87) PCT Pub. No.: WO2016/170735
PCT Pub. Date: Oct. 27, 2016

(65) Prior Publication Data
US 2018/0090990 A1    Mar. 29, 2018

(30) Foreign Application Priority Data
Apr. 21, 2015 (JP) .................. 2015-086706

(51) Int. Cl.
*H02J 50/10* (2016.01)
*H02J 50/05* (2016.01)
(Continued)

(52) U.S. Cl.
CPC .............. *H02J 50/10* (2016.02); *H02J 50/05* (2016.02); *H02M 1/44* (2013.01); *H02M 7/217* (2013.01);
(Continued)

(58) Field of Classification Search
None
See application file for complete search history.

(56) References Cited

U.S. PATENT DOCUMENTS 9,150,195 B2 * 10/2015 Suzuki ................. B60R 25/245
2006/0049693 A1 * 3/2006 Abraham ................ H04L 27/10
307/10.1
(Continued)

FOREIGN PATENT DOCUMENTS

JP     S60-187196 A    9/1985
JP     2011-188457 A   9/2011

*Primary Examiner* — Cassandra F Cox
(74) *Attorney, Agent, or Firm* — Posz Law Group, PLC

(57) ABSTRACT

A terminal device configured in a system is provided. The system includes a power feeding apparatus and a power receiving apparatus. The power receiving apparatus receives an electric power waveform from the power feeding apparatus through a harness. The power feeding apparatus supplies the power receiving apparatus with an electric power by coupling with the power receiving apparatus. The coupling is conducted by a magnetic field through the harness or an electric field through the harness. The terminal device includes a power conversion portion and a control portion. The power conversion portion is connected to a part of the harness. The control portion controls a power conversion state of the power conversion portion. The control portion controls an input impedance of the power conversion portion to be equal to a characteristic impedance of the harness.

15 Claims, 15 Drawing Sheets

(51) Int. Cl.
*H02M 1/44* (2007.01)
*H02M 7/217* (2006.01)
*H02M 1/42* (2007.01)
*H02M 1/00* (2006.01)

(52) U.S. Cl.
CPC ........ *H02M 1/4208* (2013.01); *H02M 1/4225* (2013.01); *H02M 2001/0009* (2013.01); *Y02B 70/126* (2013.01); *Y02P 80/112* (2015.11)

(56) References Cited

U.S. PATENT DOCUMENTS

| | | | | |
|---|---|---|---|---|
| 2010/0109443 A1* | 5/2010 | Cook | ................... | H01Q 1/2225 307/104 |
| 2014/0167523 A1* | 6/2014 | Tamaki | ................... | H02J 5/005 307/104 |

\* cited by examiner

COMPARISON EXAMPLE

TERMINAL DEVICE AND WIRELESS POWER FEEDING SYSTEM

CROSS REFERENCE TO RELATED APPLICATIONS

This application is a U.S. national stage application of International Patent Application No. PCT/JP2016/001783 filed on Mar. 28, 2016 and is based on Japanese Patent Application No. 2015-086706 filed on Apr. 21, 2015, the disclosure of which is incorporated herein by reference.

TECHNICAL FIELD

The present disclosure relates to a wireless power feeding system and a terminal device of the wireless power feeding system. The wireless power feeding system supplies electric power in wireless manner from a power feeding apparatus to a power receiving apparatus.

BACKGROUND ART

Recently, a system that supplies electric power in wireless manner from a power feeding apparatus to a power receiving apparatus is being developed. The system supplies the electric power in wireless manner from the power feeding apparatus to the power receiving apparatus through a harness. The power receiving apparatus employs the received electric power as the operation power.

PATENT LITERATURES

Patent Literature 1: JP 2011-188457 A
Patent Literature 2: JP S60-187196 A

SUMMARY

When a wireless power feeding system has a long harness for feeding power (for example, suppose that a signal propagated in the harness is defined to have a wavelength $\lambda$, the harness has a length of more than or equal to $\lambda/4$), the wireless power feeding system includes an outstanding node and antinode of amplitude of a standing wave. Suppose that a power receiving apparatus is located corresponding to the node of the standing wave. In this case, an electric power supply efficiency is degraded. A matching employing a termination resistor is considered for improving the electric power supply efficiency. In this case, since the termination resistor consumes electric power, the electric power consumption by the termination resistor is wasted.

In a circuit having a termination resistor, a method for collecting the electric power for eliminating the electric power consumed by the termination resistor has been considered. Usually, a transmission path may be terminated using configurations of circuits as shown in Patent Literatures 1 and 2. In a technique described in Patent Literature 2, a terminal circuit is configured to employ a switched capacitor circuit. In this configuration, when a capacitor is charged or discharged, energy is consumed by a wiring resistance. In a technique described in Patent Literature 1, impedance is adjusted by a variable resistance. In this configuration, electric power consumed by the resistance still exists more or less.

In view of the foregoing difficulties, it is an object of the present disclosure to provide a terminal device and a wireless power feeding system. The terminal device and the wireless power feeding system according to the present disclosure are capable of improving the efficiency of electric power supply from the power feeding apparatus to the power receiving apparatus regardless of a position of the power receiving apparatus. The terminal device and the wireless power feeding system according to the present disclosure are capable of collecting the electric power with high efficiency by a termination apparatus. The terminal device and the wireless power feeding system according to the present disclosure are capable of collecting the electric power with high efficiency by eliminating, to the utmost extent, unnecessary electric power consumed by the termination component.

According to an aspect of the present disclosure, a terminal device configured in a system is provided. The system includes a power feeding apparatus and a power receiving apparatus. The power receiving apparatus receives an electric power waveform from the power feeding apparatus through a harness. The power feeding apparatus supplies the power receiving apparatus with an electric power by coupling with the power receiving apparatus. The coupling is conducted by a magnetic field through the harness or an electric field through the harness. The terminal device includes a power conversion portion and a control portion. The power conversion portion is connected to a part of the harness. The control portion controls a power conversion state of the power conversion portion. The control portion controls an input impedance of the power conversion portion to be equal to a characteristic impedance of the harness.

In the above-described terminal device, the power conversion portion is connected to a part of the harness, and the control portion controls the power conversion state of the power conversion portion. The control portion controls an input impedance of the power conversion portion to be equal to a characteristic impedance of the harness. With this configuration, the terminal device can collect the electric power by the power conversion portion with the transmission path terminated. The terminal device can restrict a difference between the amplitude of node and the amplitude of antinode of a standing wave. With this configuration, suppose that the power receiving apparatus is located corresponding to any position of the harness, the terminal device can stably supply the electric power. The control portion controls the power conversion state so that the terminal device can improve a power collection efficiency. Thus, the terminal device can improve the electric power supply efficiency from the power feeding apparatus to the power receiving apparatus regardless of a position of the power receiving apparatus, and can collect the electric power with high efficiency.

According to another aspect of the present disclosure, the wireless power feeding system includes the terminal device according to the above-described aspect, the power feeding apparatus, and the power receiving apparatus receives the electric power waveform from the power feeding apparatus through the harness. The wireless power feeding system can provide advantages similar to the above-described terminal device.

BRIEF DESCRIPTION OF DRAWINGS

The above and other objects, features and advantages of the present invention will become more apparent from the following detailed description made with reference to the accompanying drawings. In the drawings.

DETAILED DESCRIPTION

Hereinafter, embodiments of a wireless power feeding system of the present disclosure will be described. In each embodiment, same or similar items are denoted by the same or the similar reference symbols, respectively, and their repetitive description might be omitted. From the second embodiment, in the case where only a part of a configuration is described, the precedingly described embodiment can be applied to the other part of the configuration.

(First Embodiment)

Figure 1A:
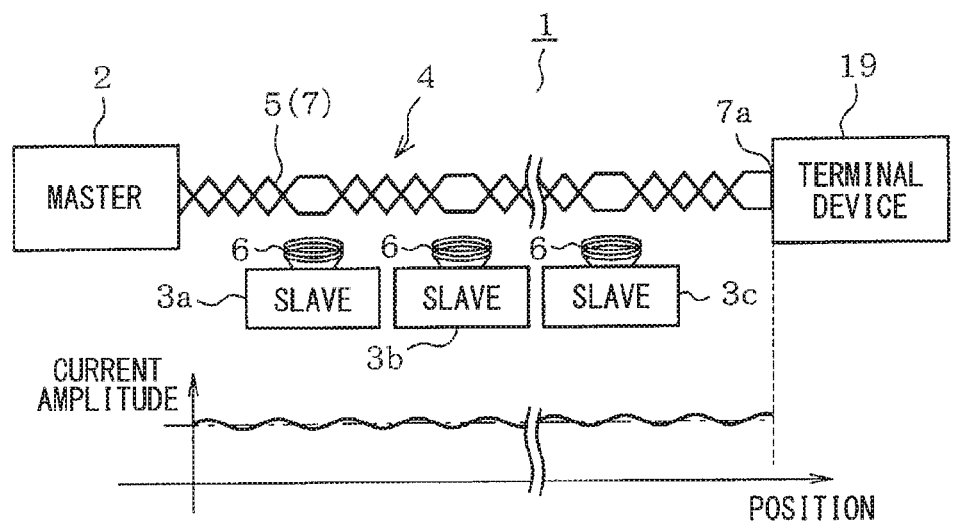
FIG. 1A is a diagram schematically showing a power feeding according to all embodiments of the present disclosure.
Figure 1B:
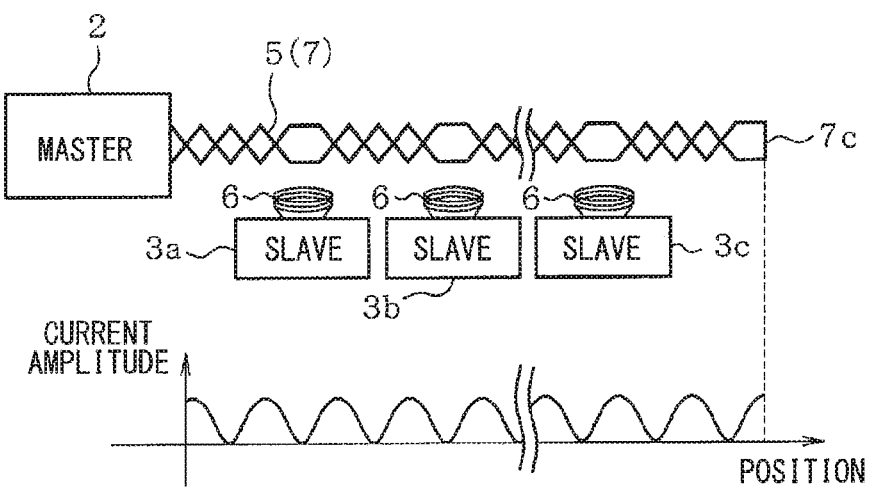
FIG. 1B is a diagram showing an example of comparison to the power feeding shown in FIG. 1A.
Figure 2:
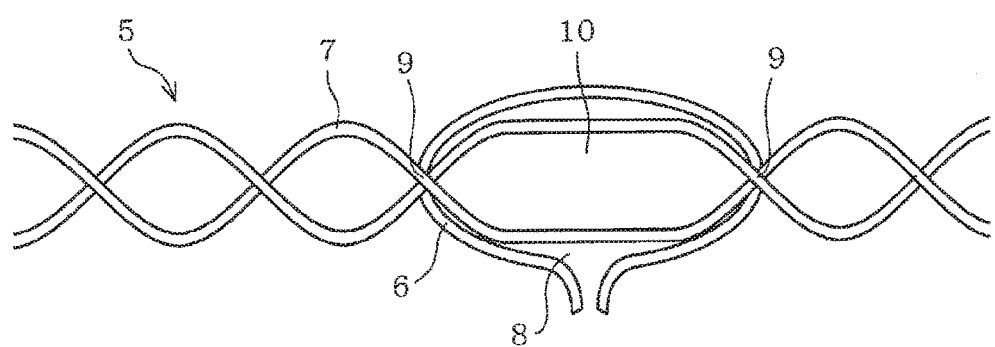
FIG. 2 is a diagram schematically showing a configuration of a harness and a power reception antenna according to a first embodiment of the present disclosure.

An outline of a technical significance according to the present disclosure will be described with reference to FIGS. 1A, 1B, and 2. As shown in FIGS. 1A and 1B, a power line power feeding system 1 functioning as a wireless power feeding system is configured by electrically or magnetically connecting a master communication apparatus 2 (corresponding to a power feeding apparatus) with slave communication apparatuses 3a, 3b, 3c (corresponding to power receiving apparatuses) via a power line 4 (a harness 5 and a power reception antenna 6).

The master communication apparatus 2 is connected to the harness 5 functioning as the power line 4. The slave communication apparatuses 3a, 3b, 3c are connected to the respective power reception antennas 6 functioning as the power line 4. In the present embodiment, the power reception antenna 6 is provided by a coil having an opening 8. As shown in FIG. 2, the harness 5 may be provided by a pair of twisted cables (twisted pair cable) 7. The opening 8 of the coil of the power reception antenna 6 is oriented to an opening 10 located between adjacent two twisted portions 9 in the twisted pair cable 7. In this configuration, when the master communication apparatus 2 outputs alternating current power through the harness 5, the harness 5 and the power reception antenna 6 are coupled through electromagnetic induction (that is, electric field coupling or magnetic field coupling). Thus, each of the slave communication apparatuses 3a, 3b, 3c is capable of being supplied with AC power.

Figure 3:
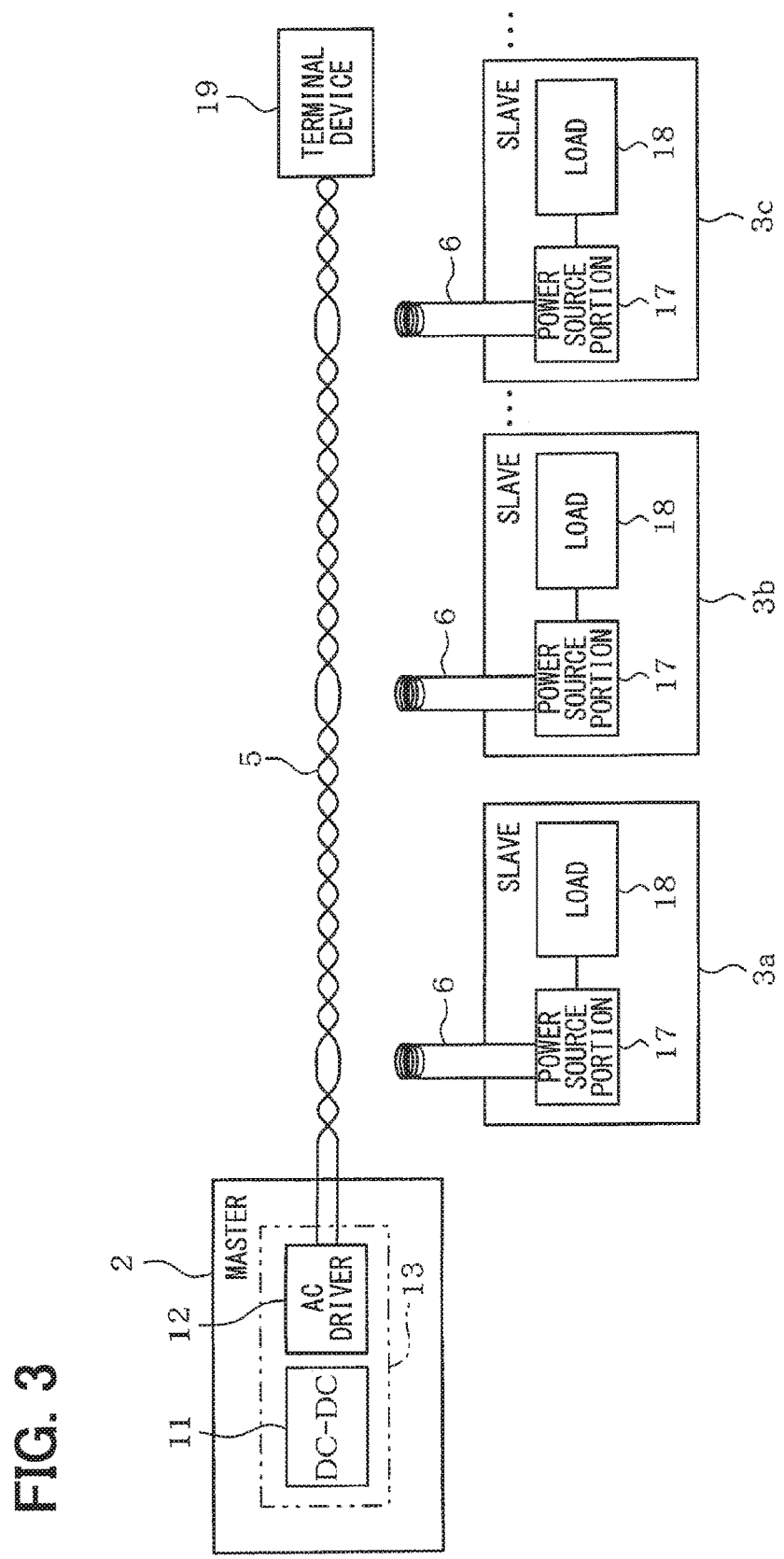
FIG. 3 is a block diagram schematically showing an example of electrical configuration of a power feeding apparatus and a power receiving apparatus.

As shown in FIG. 3, the master communication apparatus 2 includes a power feeding portion 13 having a DC-DC converter 11 and an AC driver 12. The power feeding portion 13 inputs a voltage supplied by a battery to the DC-DC converter 11 and obtains a direct current voltage. The AC driver 12 generates a sine wave (or a rectangular wave) electric power waveform having a predetermined frequency (for example, less than or equal to several MHz) by converting the DC voltage, and then the electric power waveform is output to the harness 5. The harness 5 outputs a power feeding signal having the above-described electric power waveform to an outside as an electromagnetic wave. Each of the slave communication apparatuses 3a, 3b, 3c includes a power source portion 17 and a load 18 in addition to the power reception antenna 6. The power reception antenna 6 is connected to the power source portion 17. The power source portion 17 may rectify and smooth the electric power supplied from the power reception antenna 6 and generates an electric power. The power source portion 17 supplies the load 18 with the generated electric power. The power source portion 17 may include a matching circuit for the power reception antenna 6. The power source portion 17 may be properly configured as needed.

The following will describe configurations shown in FIGS. 1A and 1B. FIG. 1B shows an example of comparison to FIG. 1A. The harness 5 is provided by the twisted pair cable 7, and the twisted pair cable 7 is short-circuited at the terminal portion 7c. A wavelength corresponding to a frequency of a signal with which the master communication apparatus 2 communicates with each of the slave communication apparatuses 3a, 3b, 3c is defined as λ. In a steady state condition, when a length of the harness 5 is relatively long (for example, longer than or equal to λ/4), in response to a signal output from the master communication apparatus 2, a standing wave is generated by superposition of a traveling wave and a reflected wave.

This standing wave is defined by the wavelength λ, and amplitude at a position on the standing wave is approximately determined by a distance from the terminal portion 7c of the harness 5. When the power reception antenna 6 of each of the slave communication apparatuses 3a, 3b, 3c is disposed at a position corresponding to an antinode of the standing wave, the greater power is capable of being provided to the power reception antenna 6 from the harness 5. When the power reception antenna 6 of each of the slave communication apparatuses 3a, 3b, 3c is disposed at a position corresponding to a node of the standing wave, a magnitude of the standing wave tends to be smaller. So, it may be difficult to efficiently supply the electric power to the power reception antenna 6. As shown in FIG. 1A, a terminal device 19 functioning as a power collection apparatus is connected to a part of the harness 5 (connected to the terminal portion 7c of the twisted pair cable 7).

When the terminal device 19 having an input impedance which matches with a characteristic impedance of the harness 5 (for example, 100Ω) is connected to the harness 5, as shown in FIG. 1A, a difference between a maximum amplitude and a minimum amplitude of the standing wave can be restricted. With this configuration, the power reception antenna 6 of each of the slave communication apparatuses 3a, 3b, 3c can be stably supplied with the electric power even though the power reception antenna 6 is disposed at any position relative to the harness 5. Suppose that a termination resistor is used as the terminal device 19. In this case, the termination resistor consumes the electric power and the electric power cannot be employed efficiently. Thus, the terminal device 19 is preferably configured as shown in FIG. 4.

Figure 4:
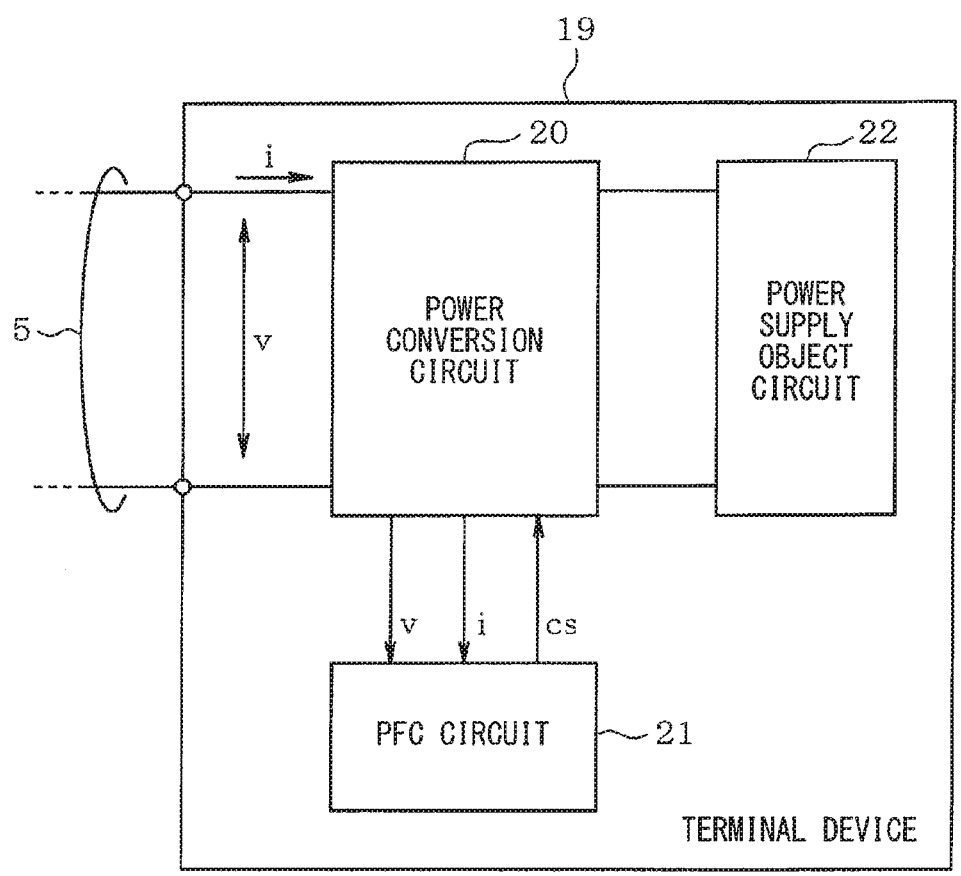
FIG. 4 is a diagram schematically showing an exemplary electrical configuration of a terminal device.

As shown in FIG. 4, the terminal device 19 includes a power conversion circuit (corresponding to a power conversion portion) 20 and a PFC circuit (corresponding to a control portion) 21. A power supply object circuit 22 is configured to be connected to a rear stage of the terminal device 19. In the power conversion circuit 20, input current i represents current input from the harness 5, and input voltage v represents voltage between both of the terminals of the harness 5. The PFC circuit 21 controls a power conversion state of the power conversion circuit 20 corresponding to the information of the input current i and the input voltage v. The PFC circuit 21 generates a control signal cs that improves a power factor of the power conversion circuit 20 in order to be capable of regarding an input impedance of the power conversion circuit 20 as a pure input resistance to the utmost extent. The PFC circuit 21 outputs the control signal cs to the power conversion circuit 20. The power conversion circuit 20 converts the electric power in response to the control signal cs. The input impedance of the power conversion circuit 20 is controlled by the PFC circuit 21, and the power conversion circuit 20 supplies the input electric power to the power supply object circuit 22. The power supply object circuit 22 is supplied with the electric power by the power conversion circuit 20, and then consumes the supplied electric power.

Figure 5:
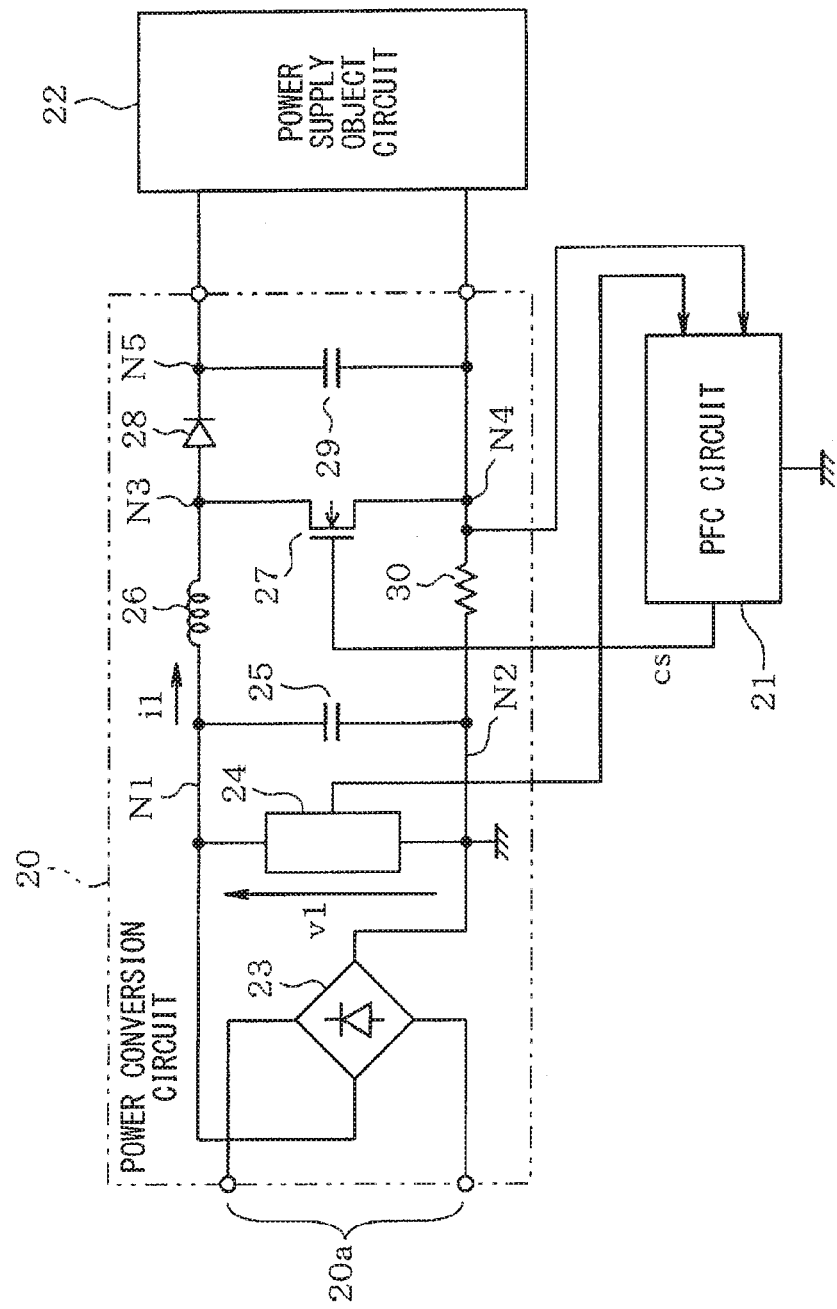
FIG. 5 is a diagram schematically showing an exemplary circuit configuration of a power conversion portion.

FIG. 5 shows an exemplary electric configuration of the power conversion circuit 20. As shown in FIG. 5, the power conversion circuit 20 includes a bridge circuit 23, a resistance voltage divider circuit 24, a capacitor 25, a coil 26, a switching element 27, a diode 28, a capacitor 29, and a shunt resistance 30 functioning as a current detection circuit. The elements of the power conversion circuit 20 are configured as shown in FIG. 5. The bridge circuit 23 may be provided by a full wave rectifier diode bridge. An input terminal 20a of the power conversion circuit 20 is connected to an input terminal of the bridge circuit 23. The bridge circuit 23 performs full wave rectification to the signal input from the harness 5, and outputs rectified signal to a parallel circuit in which the resistance voltage divider circuit 24 and the capacitor 25 are connected in parallel. The capacitor 25 functions as a high frequency noise eliminator, and eliminates a noise of the output voltage output from the bridge circuit 23. A capacitance of the capacitor 25 is set under a condition that the capacitance of the capacitor 25 does not affect a frequency band of the input voltage. The capacitor 25 may be omitted. The resistance voltage divider circuit 24 divides the direct current voltage output from the bridge circuit, and outputs the divided direct current voltage to the PFC circuit 21.

A potential output node N1 of a terminal of the capacitor 25 is connected to the power supply object circuit 22 through the coil 26 and the diode 28. The diode 28 passes electrical current converted by the power conversion circuit 20 to the power supply object circuit 22 in a single direction. The shunt resistance 30 is connected to a potential output node N2 of the bridge circuit 23 in series. That is, the potential output node N2 of another terminal of the capacitor 25 is connected to the power supply object circuit 22 through the shunt resistance 30.

Input nodes of the power supply object circuit 22 include an input node N5 and another input node N4. The coil 26 and the diode 28 are connected with one another at a common connection node N3. The switching element 27 (for example, a source and a drain of an N-channel MOS transistor) is connected between the common connection node N3 and another input node N4 of the power supply object circuit 22. A cathode node of the diode 28 is connected to the input node N5 of the power supply object circuit 22. The capacitor 29 disposed on the output stage is connected between the input node N5 and another input node N4.

The capacitor 29 disposed on the output stage is provided by a smoothing capacitor. The capacitor 29 is capable of outputting the voltage converted by the power conversion circuit 20 to the power supply object circuit 22. The current flowing through the power conversion circuit 20 is detected by the shunt resistance 30. The voltage detected by the shunt resistance 30 is input to the PFC circuit 21. The PFC circuit 21 outputs the control signal cs to the switching element 27 based on a voltage divided by the resistance voltage divider circuit 24 and a detection voltage (detection current) detected by the shunt resistance 30. The PFC circuit 21 controls the switching element 27 to switch on or switch off based on the control signal cs. The PFC circuit 21 controls a current amount of the current i1 flowing through the coil 26 and a current amount of the input current i shown in FIG. 4 by controlling an on state or an off state of the switching element 27. The PFC circuit 21 controls input impedance Zin calculated by the input current i and the input voltage v so that the calculated input impedance is equal to the predetermined characteristic impedance of the harness 5. A control frequency and an operation frequency (on or off switching frequency of the switching element 27) is set to be greater than a frequency of a data modulation signal from the master communication apparatus 2 to the slave communication apparatuses 3a, 3b, 3c, a power feeding signal, and a mixed signal.

Figure 6:
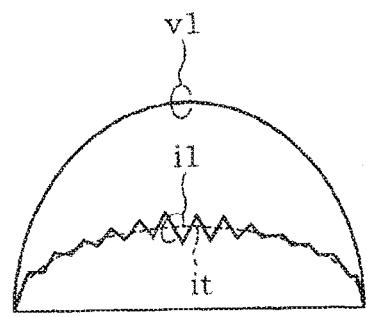
FIG. 6 is a time chart schematically showing a relation between an input voltage and an input current of the power conversion portion.
Figure 7:
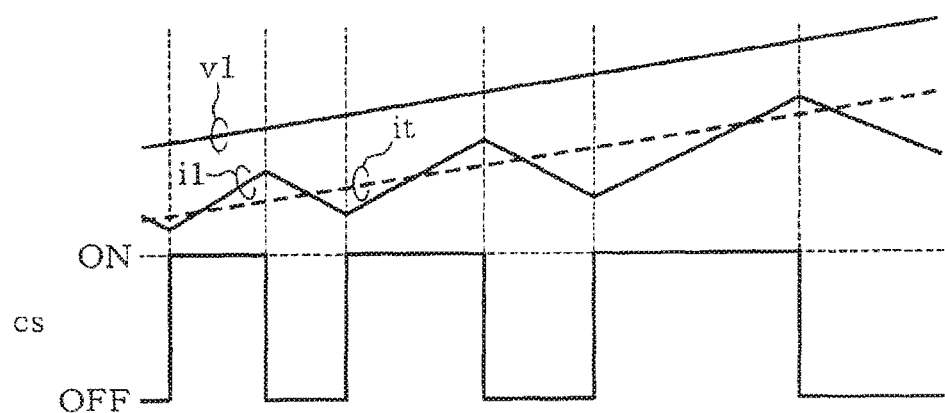
FIG. 7 is a time chart showing a relation, which is partially enlarged, among the input voltage, the input current, and a control signal.

A schematic time chart in FIG. 6 shows a relation among the output voltage v1 of the bridge circuit 23, the current i1 flowing through the coil 26, and an average current it. FIG. 7 shows a relation, which is partially enlarged, among the voltage v1, the current i1, the average current it, and the control signal cs. As shown in FIGS. 6 and 7 (especially, in FIG. 7), during a turn-on state of the control signal cs, the PFC circuit 21 allows the electric current to flow through the switching element 27, and thereby increasing the input current i1 flowing to the coil 26. During a turn-off state of the control signal cs, the PFC circuit 21 forbids the electric current to flow through the switching element 27, and thereby decreasing the input current i1 flowing to the coil 26. With this configuration, when determining that the amount of the input current i1 is low, the PFC circuit 21 increases the input current i1 to the coil 26 by turning on the control signal cs. When determining that the amount of the input current i1 is high, the PFC circuit 21 decreases the input current i1 to the coil 26 by turning off the control signal cs. The PFC circuit 21 removes a phase shift between the input voltage v1 and the input current i1 to the utmost extent in order to set the input impedance Zin as the pure resistance. The PFC circuit 21 controls a ratio of the input voltage v1 to the input current i1, that is, v1/i1 as a constant value. Thus, the PFC circuit 21 is capable of controlling the input impedance Zin to be equal to the characteristic impedance Z0 of the harness 5. The difference between the input voltage v and the output voltage v1, and the difference between the input current i and the output current i1 are caused by the current rectification operation of the bridge circuit 23. In this case, an internal resistance of the bridge circuit 23 is capable of being ignored. Thus, the PFC circuit 21 can control the ratio of the input voltage v1 to the input current i1, that is, v1/i1 equal to a predetermined value. With this configuration, the PFC circuit 21 is capable of controlling the input impedance Zin of the power conversion circuit 20 equal to the characteristic impedance Z0 of the harness 5. As described above, the impedance of the power conversion circuit 20 is capable of being set to be equal to the impedance of the harness 5. This configuration enables efficient collection of the electric power, and efficient supply of the DC power converted by the power conversion circuit 20 to the power supply object circuit 22.

The resistance voltage divider circuit 24 shown in FIG. 5 has high resistance (for example, on an order of MΩ). Each of the capacitor 25, the coil 26, the diode 28 and the capacitor 29 does not include resistance component in principle and functions as a lossless element. So, the electric power is not consumed by these components in principle. Thus, an electric power conversion can be performed with high efficiency, and the electric power can be collected with high efficiency.

A control to make the circuit operate in a continuous conduction mode, which can decrease a current ripple of the coil 26, is favorable to be performed. In the continuous conduction mode, the current continuously flows through the coil 26 corresponding to switching on or switching off of the switching element 27. With this mode, harmonic current can be restricted. When a Schottky barrier diode, or the like, which has short recovery time and low recovery current, is employed as the diode 28, the outstanding advantages can be provided.

According to the above-described embodiment, the amplitude of the standing wave can maintain a constant magnitude to the utmost extent. With this configuration, the efficiency of electric power supply from the master communication apparatus 2 to the slave communication apparatuses 3a, 3b, 3c can be improved. The terminal device 19 is attached to a terminal end of the harness 5, and the power conversion circuit 20 included in the terminal device 19 is controlled by the PFC circuit 21. With this configuration, the electric power collection can be efficiently performed.

(Second Embodiment)

Figure 8:
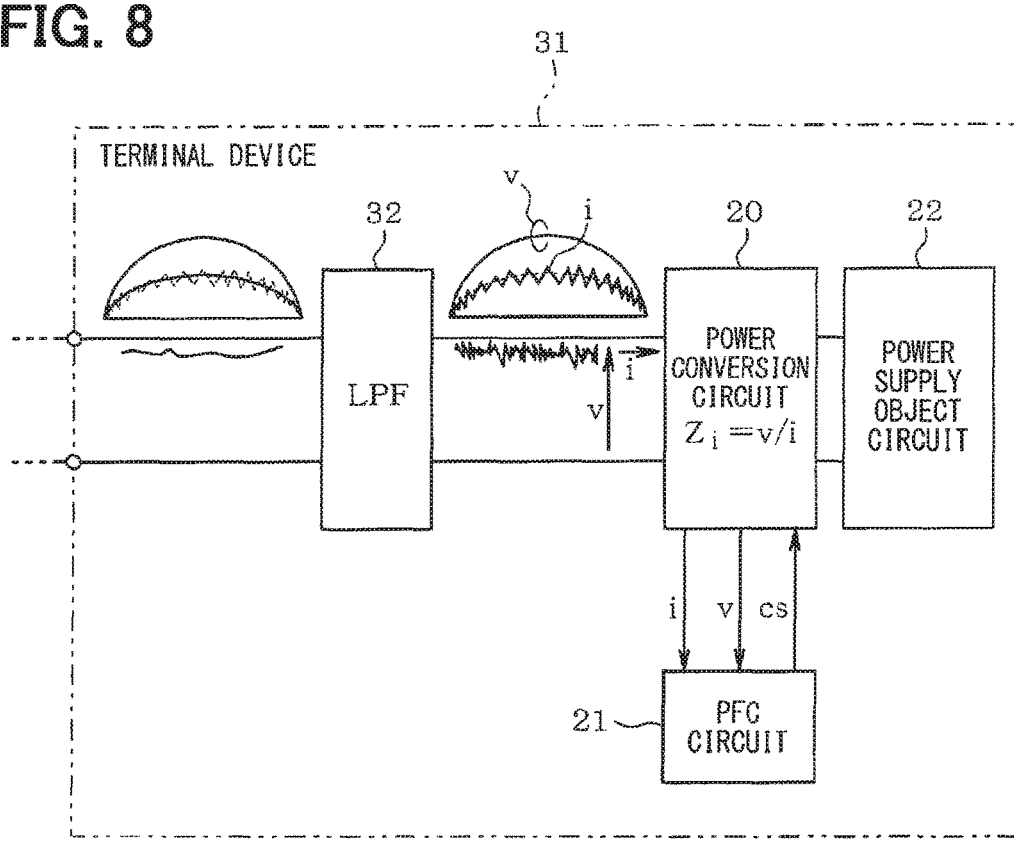
FIG. 8 is a diagram schematically showing an exemplary electrical configuration of a terminal device according to a second embodiment of the present disclosure.

FIG. 8 is an additional explanation diagram according to a second embodiment. FIG. 8 shows a terminal device 31 which is used instead of the terminal device 19. In the terminal device 31, a filter 32 is disposed between the harness 5 and the power conversion circuit 20. The filter 32 is provided by, for example, a low pass filter (LPF) that cuts a harmonic noise having a frequency higher than the operation frequency. The harmonic noise is generated during a switching operation of the switching element 27 of the power conversion circuit 20. The filter 32 may employ other kinds of filter, such as a band pass filter. Suppose that the switching element 27 switches on or switches off for controlling the input current, and a switching noise is generated during the switching process. In this case, the filter 32 of the preceding stage cuts the high harmonic noise component so that a leak of the high harmonic noise to the harness 5 can be restricted. With this configuration, an EMI (Electro Magnetic Interference) noise can be restricted. Providing of the filter 32 can reduce the EMI generated by the switching noise. So, the control can be performed in a critical conduction mode.

As shown in the first embodiment, the control may be performed in the continuous conduction mode. Alternatively, the control may be performed in the critical conduction mode, which is capable of restricting the ripple, instead of the continuous conduction mode. In the configuration shown in FIG. 5, in order to perform the critical conduction mode, when the current flowing from a rectifier diode 28 to the shunt resistance 30 becomes zero, current flows through the coil 26 by turning on the switching element 27, and the average current is controlled by controlling the current flowing through the coil 26. In this configuration, the PFC circuit 21 keeps the input impedance at a constant value by keeping the ratio of the input voltage v to the average current it at a constant value. Employment of the critical conduction mode can simplify the control method. The configuration described in the present embodiment can provide advantages similar to the above-described embodiment.

(Third Embodiment)

Figure 9:
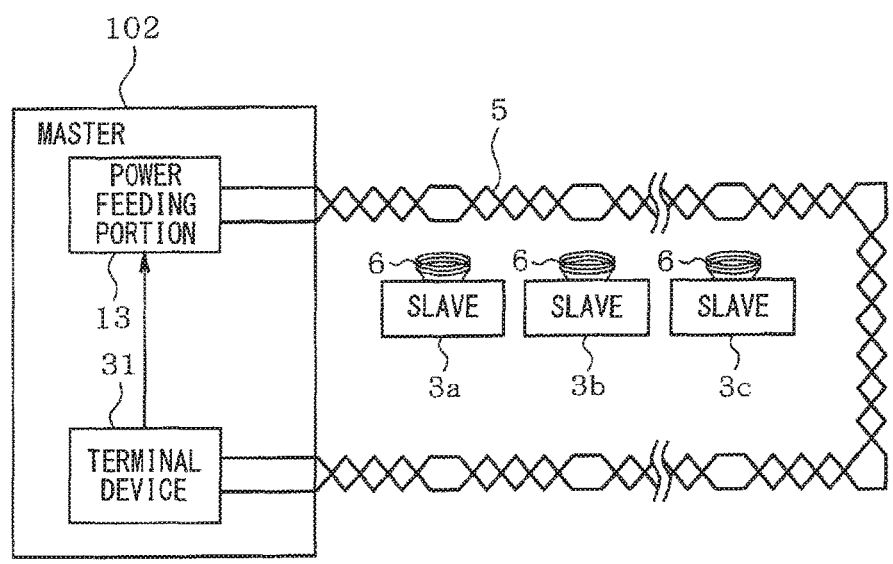
FIG. 9 is a block diagram schematically showing an exemplary configuration of a power feeding apparatus according to a third embodiment of the present disclosure.

FIG. 9 shows an additional explanation diagram according to a third embodiment. As shown in FIG. 9, the terminal device 31 may be configured in a master communication apparatus 102, and an internal circuit configuration (for example, the power feeding portion 13) of the master communication apparatus (the power feeding apparatus) 102 may be applied as the power supply object circuit 22. In this case, the harness 5 is configured to extend from the master communication apparatus 2 in a loop shape, and returns to the master communication apparatus 102. Each of the slave communication apparatuses 3a, 3b, 3c is disposed corresponding to the extended portion of the harness 5.

The terminal device 31 is attached to the terminal end of the harness 5, and disposed in the master communication apparatus 102. The master communication apparatus 102 includes the power feeding portion 13, which may be provided by the DC-DC converter 11 and the AC driver 12. The power feeding portion 13 and the power conversion circuit 20 disposed in the terminal device 31 are connected by the power line. With this configuration, the electric power collected by the terminal device 31 can be provided to the internal circuit of the master communication apparatus 102. The configuration described in the present embodiment can provide advantages similar to the above-described embodiment, and the electric power collected by the terminal device 31 can be effectively used by the master communication apparatus 102 by circulating the electric power.

(Fourth Embodiment)

Figure 10:
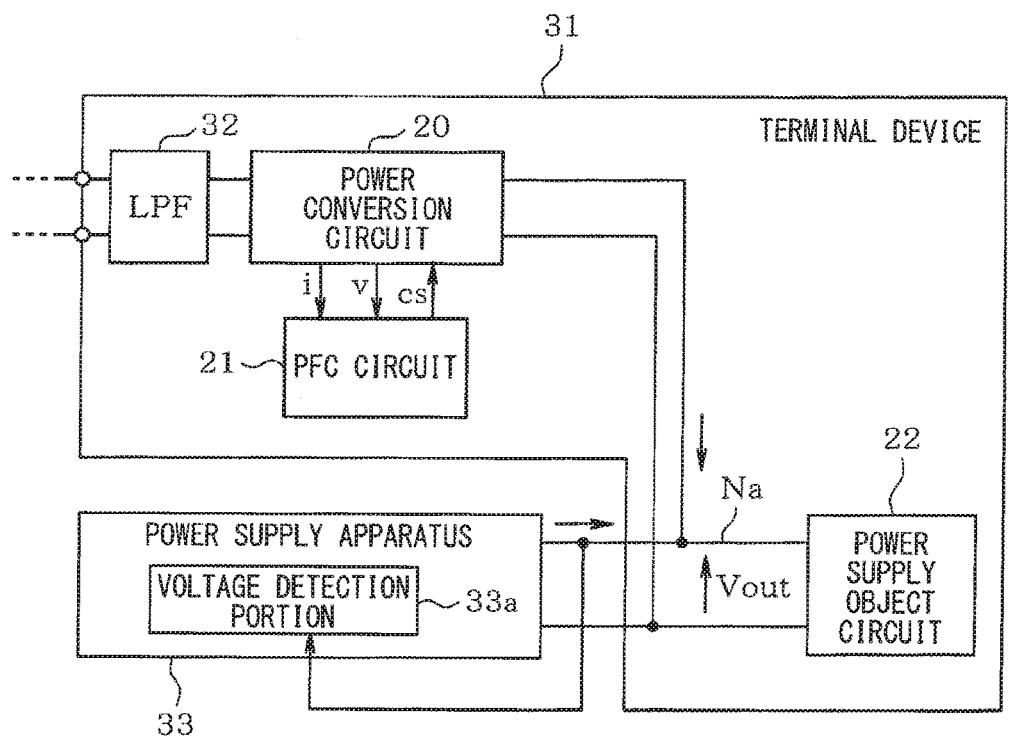
FIG. 10 is a diagram schematically showing an electrical configuration of connection between a terminal device and a power supply apparatus according to a fourth embodiment of the present disclosure.
Figure 11:
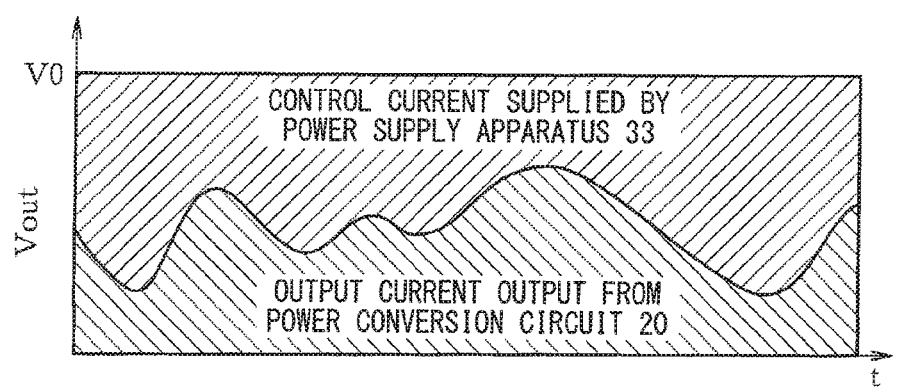
FIG. 11 is a time chart schematically showing a control changing with time.

FIGS. 10 and 11 show additional explanation diagrams according to a fourth embodiment. In the fourth embodiment, the power conversion circuit 20 of the terminal device 31 and a power supply apparatus 33 (corresponding to a first power supply apparatus) are interconnected. In this configuration, an output voltage Vout maintains a constant voltage by the control performed by the power supply apparatus 33.

The power collected by the terminal device 31 is supplied to the power supply object circuit 22 through a power supply node Na. In the present embodiment, the power supply apparatus 33 is additionally connected to the power supply node Na. The power supply apparatus 33 generates a voltage from a given voltage (for example, from a battery power supply voltage), and outputs the voltage to the power supply node Na. The power supply apparatus 33 includes a voltage detection portion 33a that detects the voltage Vout of the power supply node Na of the power supply object circuit 22. The power supply apparatus 33 controls the voltage Vout detected by the voltage detection portion 33a so that the detected voltage Vout maintains a constant voltage V0. With this configuration, suppose that the output voltage of the power conversion circuit 20 irregularly changes, the stable constant voltage V0 can be supplied to the power supply object circuit 22. FIG. 11 shows a configuration in which the power supply apparatus 33 offsets a shortage for making the output voltage from the power conversion circuit 20 be equal to the constant voltage V0. Suppose that the output voltage Vout of the power conversion circuit 20 is greater than the constant voltage V0. In this case, the power supply apparatus 33 may be configured to control the voltage Vout to be decreased to the constant voltage V0. The energy collected by the power conversion circuit 20 may be consumed in a manner of heat release by disposing a termination resistor for electric power consumption purpose (not shown in figures). With this configuration, the collected energy is discarded.

The configuration described in the present embodiment can provide advantages similar to the above-described embodiment, and the constant voltage V0 can be provided to the power supply object circuit 22.

(Fifth Embodiment)

Figure 12:
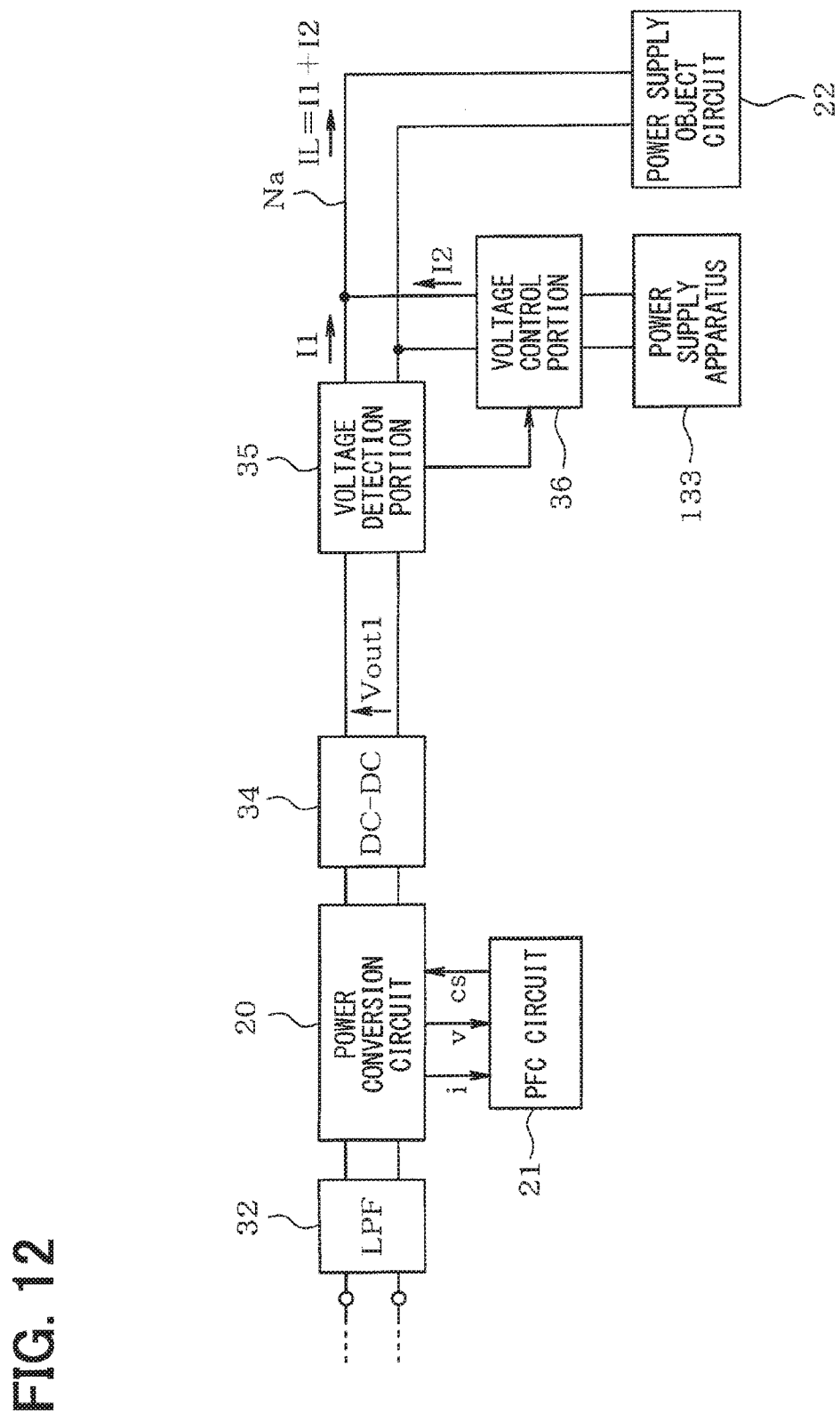
FIG. 12 is a diagram schematically showing an electrical configuration of connection between a terminal device and a power supply apparatus according to a fifth embodiment of the present disclosure.
Figure 13:
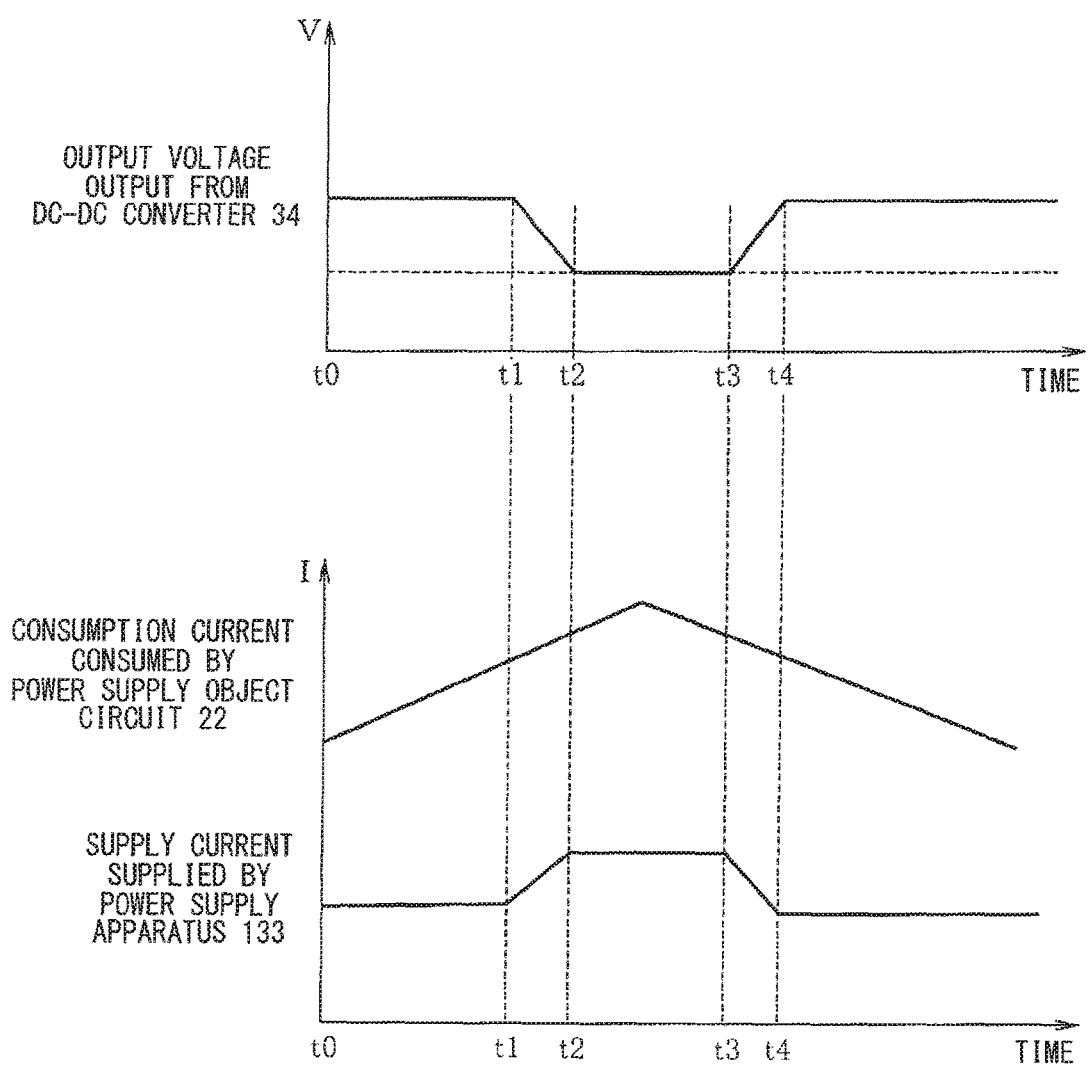
FIG. 13 is a time chart schematically showing a control changing with time.

FIGS. 12 and 13 show additional explanation diagrams according to a fifth embodiment. In the fifth embodiment, a modification of the fourth embodiment will be described. In the present embodiment, as shown in FIG. 12, the power conversion circuit 20 outputs the output voltage to a DC-DC converter 34. The DC-DC converter 34 performs a DC-DC conversion to the voltage output from the power conversion circuit 20, and then outputs voltage Vout1. The voltage Vout1 is supplied to the power supply node Na through the voltage detection portion 35. With this configuration, the power supply object circuit 22 is supplied with the voltage Vout1.

A power supply apparatus 133 (corresponding to the first power supply apparatus) instead of the power supply apparatus 33 is connected to the power supply node Na through a voltage control portion 36. The voltage control portion 36 controls the output voltage of the power supply apparatus 133, which is output to the power supply node Na, corresponding to the voltage detected by the voltage detection portion 35. When the voltage detected by the voltage detection portion 35 decreases, the power supply apparatus 133 supplies an amount of the current shortage based on a decreased amount of the detected voltage. Current output from the DC-DC converter 34 through the voltage detection 35 is defined as current I1. Current output from the power supply apparatus 133 through the voltage control portion 36 is defined as current I2. Load current IL flowing to the power supply object circuit 22 is defined as a sum of the current I1 and the current I2 (IL=I1+I2).

As shown in FIG. 13, the DC-DC converter 34 outputs the approximately constant voltage even though the load current IL changes with time (see t0→t1 of FIG. 13). When the consumption of the load current IL of the power supply object circuit 22 increases, the output current of the DC-DC converter 34 decreases and then the output voltage of the DC-DC converter 34 decreases (see t1→t2 of FIG. 13). In this case, the voltage control portion 36 detects the reduction of the output voltage Vout1 caused by the voltage detection portion 35, and the power supply apparatus 133 increases supply current. Thus, this configuration can deal with the increase of the load current IL (see t1→t2→t3 of FIG. 13).

When the consumption of the load current IL decreases, the output current of the DC-DC converter 34 increases and the voltage detected by the voltage detection portion 35 increases (see t3→t4 of FIG. 13). In this case, the voltage control portion 36 detects the increase of the output voltage Vout1. As described above, the increase of the output voltage Vout1 is detected by the voltage detection portion 35. The power supply apparatus 133 decreases current supply. Thus, this configuration can deal with the reduction of the load current IL. With this configuration, the output voltage Vout1 is dynamically adjusted in real time based on the change of the load current IL. The configuration described in the present embodiment can provide advantages similar to the fourth embodiment.

(Sixth Embodiment)

Figure 14:
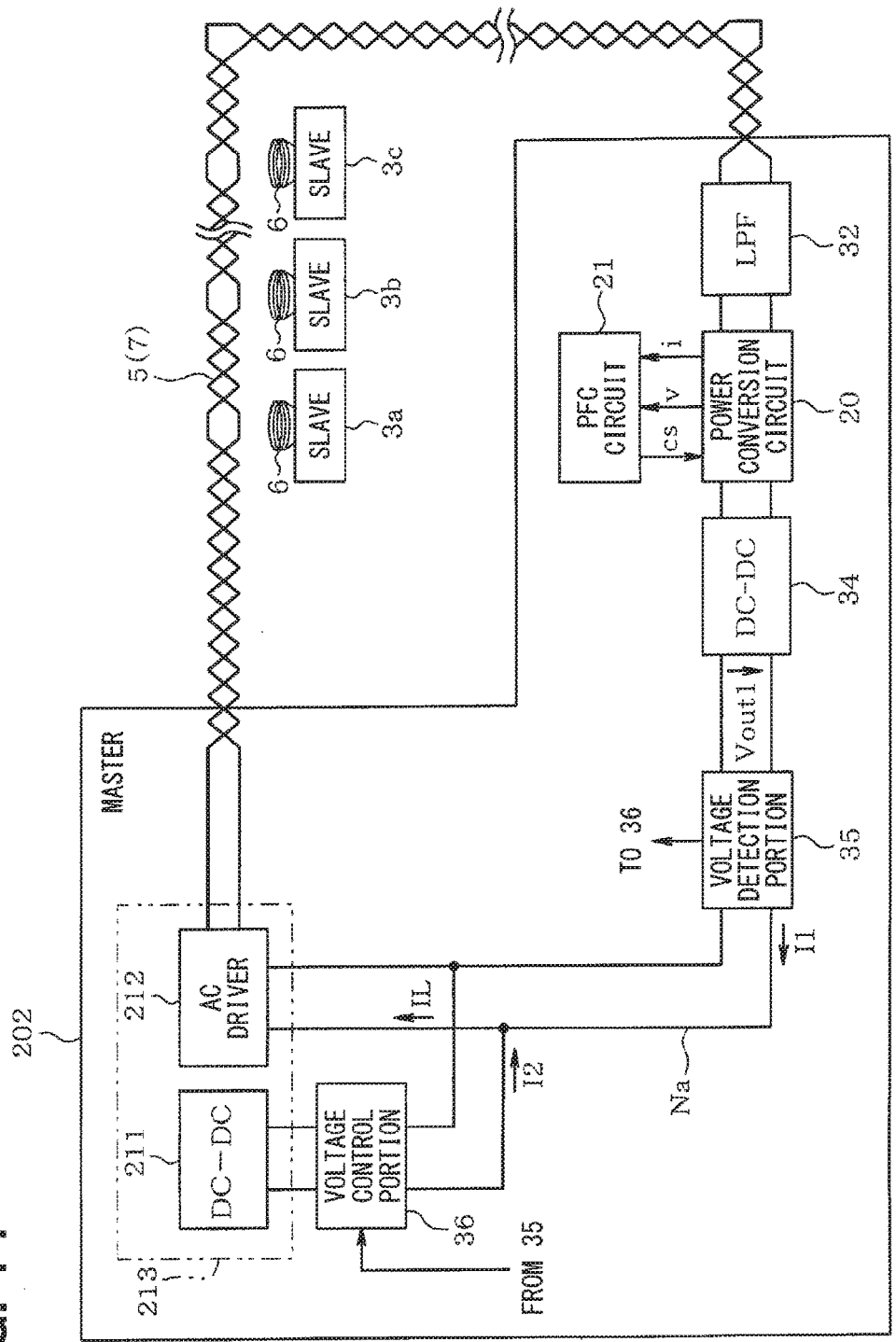
FIG. 14 is a diagram schematically showing a system configuration according to a sixth embodiment of the present disclosure.

FIG. 14 shows an additional explanation diagram according to a sixth embodiment. The sixth embodiment combines a technique concept of the fifth embodiment with a technique concept of the third embodiment. The configuration shown in FIG. 14 combines the configuration according to the fifth embodiment (see FIG. 12) with the configuration according to the third embodiment (see FIG. 9). In the configuration shown in FIG. 14, the master communication apparatus 202 includes a power feeding portion 213 instead of the power feeding portion 13, and also includes the filter 32, the power conversion circuit 20, the PFC circuit 21, the DC-DC converter 34, the voltage detection portion 35, and the voltage control portion 36. The power feeding portion 213 includes a DC-DC converter (corresponding to a second power supply apparatus) 211 having approximately the same function as the DC-DC converter 11 and an AC driver (corresponding to a power supply object circuit) 212 having approximately the same function as the AC driver 12. In the system, the DC-DC converter 34 collects a part of the electric power from the harness 5, and performs the DC-DC conversion to the collected electric power.

The DC-DC converter 34 supplies the collected electric power voltage to the AC driver 212 by outputting the DC electric power voltage to the node Na through the voltage detection portion 35. The voltage detection portion 35 detects the voltage of the node Na. The voltage control portion 36 controls output voltage of the DC-DC converter 211 to be constant based on the voltage detected by the voltage detection portion 35, and outputs the controlled constant voltage. This configuration can stably supplies the constant voltage to the AC driver 212, and the AC driver 212 can stably output a power feeding signal having the predetermined frequency. Thus, as shown in FIG. 14, the AC driver 212 of the master communication apparatus 202 may be applied to the power supply object circuit 22 of the fifth embodiment. The configuration described in the present embodiment can provide advantages similar to the above-described embodiment.

(Seventh Embodiment)

Figure 15:
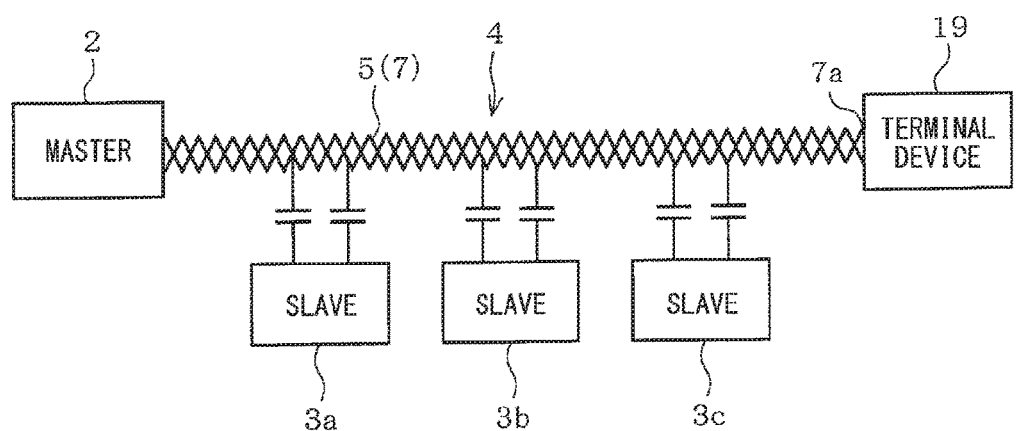
FIG. 15 is a diagram schematically showing a configuration of a power feeding according to a seventh embodiment of the present disclosure.

FIG. 15 shows an additional explanation diagram according to a seventh embodiment. As shown in FIG. 15, corresponding to the frequency band of the current signal flowing through the harness 5, the power feeding performed from the harness 5 to the slave communication apparatuses 3a, 3b, 3c may be achieved in a capacitive coupling manner (electric field coupling manner).

(Eighth Embodiment)

Figure 16:
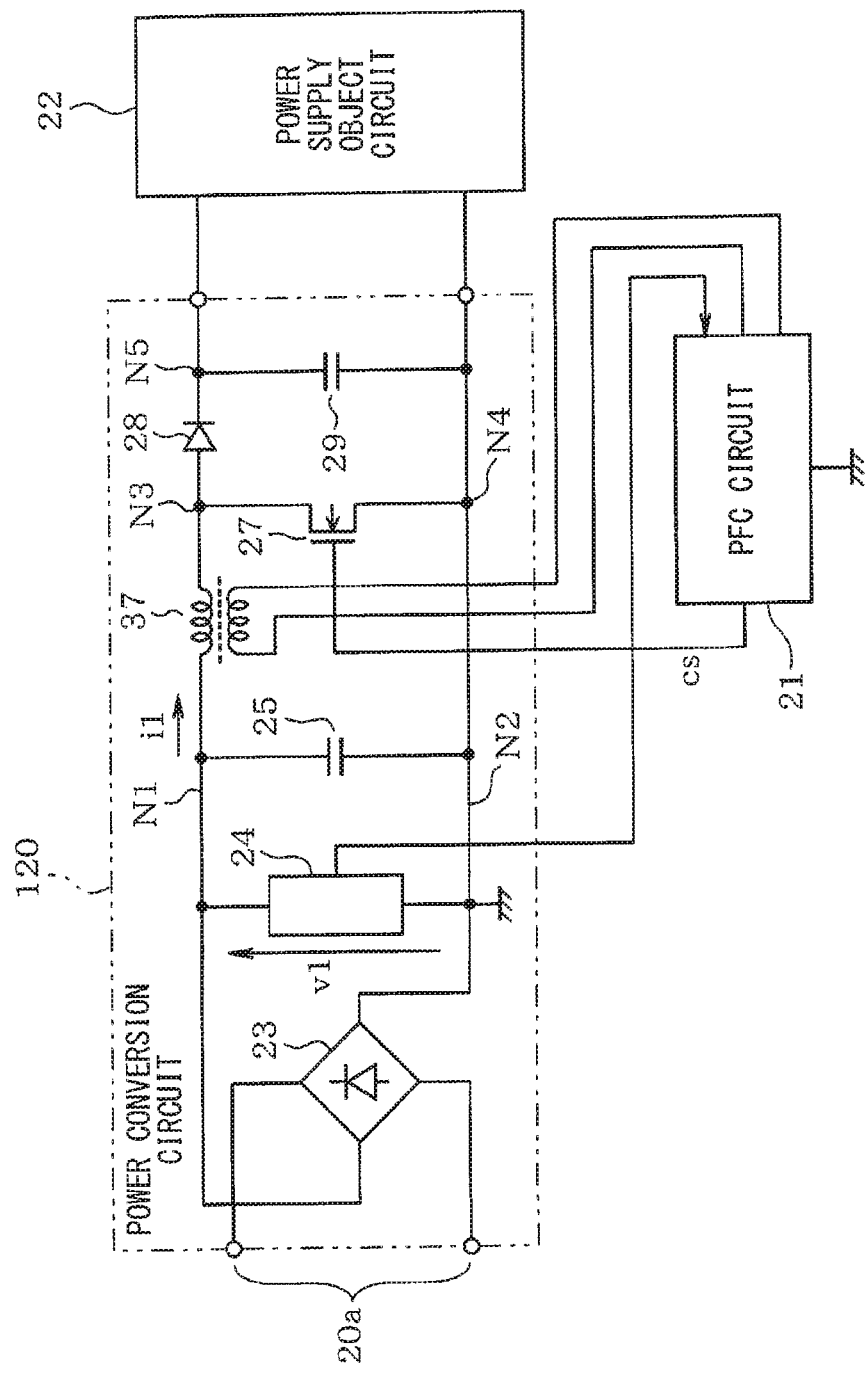
FIG. 16 is a diagram schematically showing a configuration of a power conversion portion according to an eighth embodiment of the present disclosure.

FIG. 16 shows an additional explanation diagram according to an eighth embodiment. In the eighth embodiment, a power conversion circuit 120 includes a transformer 37 functioning as the current detection circuit. The power conversion circuit 120 is used instead of the power conversion circuit 20. The transformer 37 is used instead of the coil 26 and the shunt resistance 30, and has the same function of the coil 26 in the above-described embodiment. The transformer 37 detects the input current i1. As shown FIG. 16, in the power conversion circuit 120, the transformer 37 is disposed on a flowing path of the input current i1. The transformer 37 is connected to the potential output node N1 of the bridge circuit 23 in series. The current i1 flows into a primary side of the transformer 37, and a secondary side of the transformer 37 outputs a voltage related to the input current i1. With this configuration, the PFC circuit 21 can acquire information of the input current i1. The configuration described in the present embodiment can provide advantages similar to the above-described embodiment.

(Ninth Embodiment)

Figure 17:
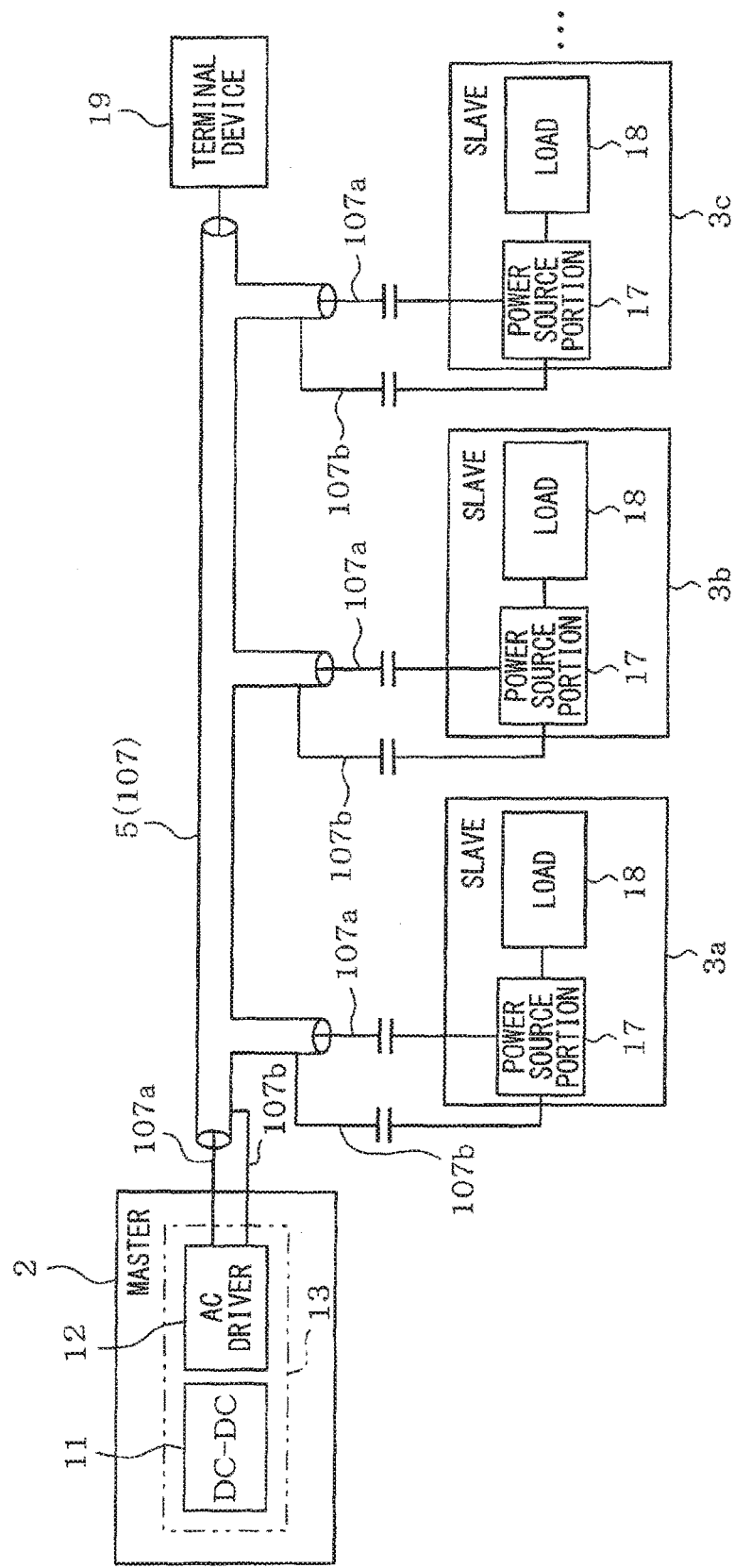
FIG. 17 is a diagram schematically showing a configuration of a power feeding (in electric field coupling manner) according to a ninth embodiment of the present disclosure.
Figure 18:
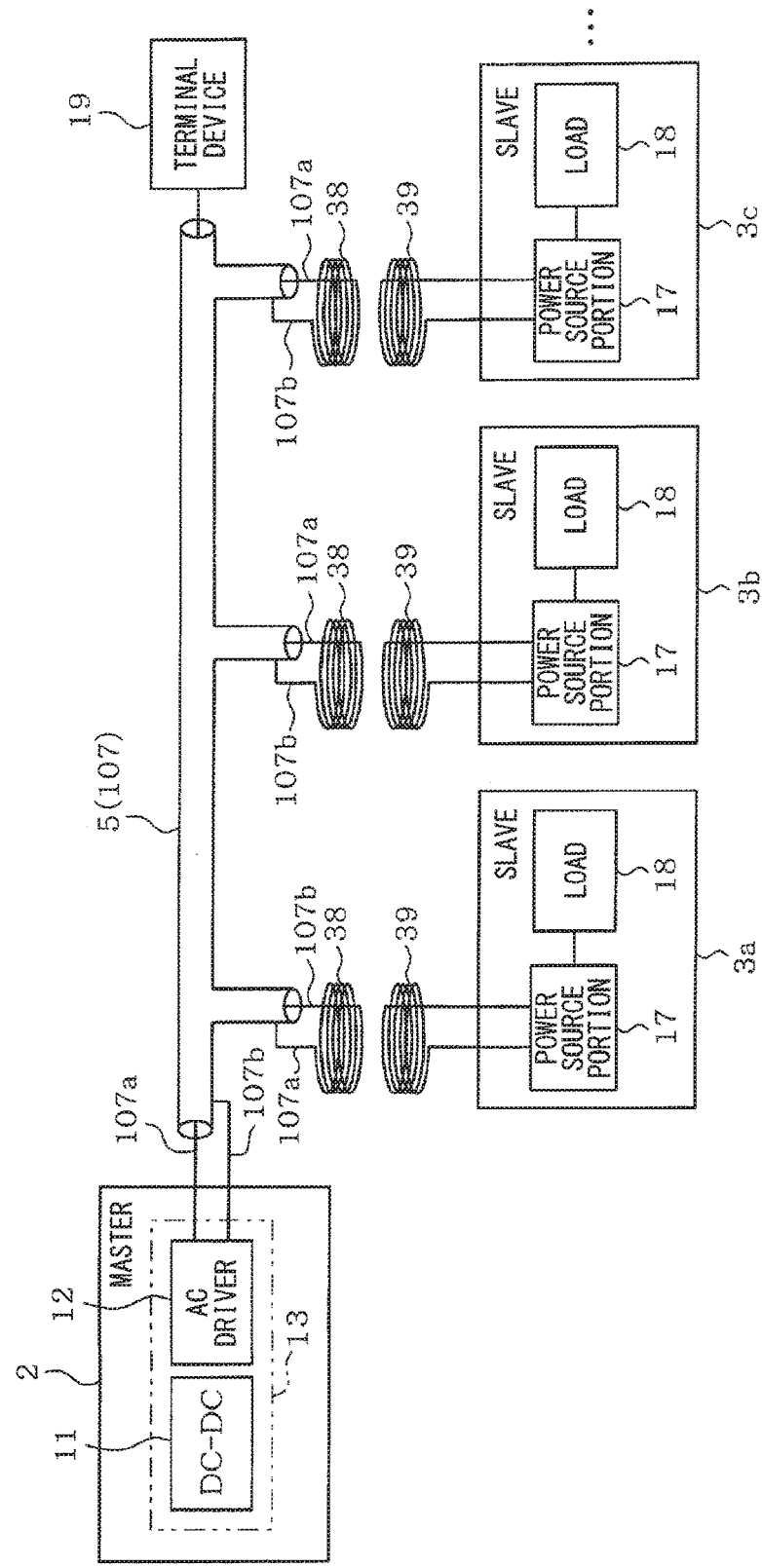
FIG. 18 is a diagram schematically showing a configuration of a power feeding (in magnetic field coupling manner) via the harness.

FIGS. 17 and 18 show additional explanation diagrams according to a ninth embodiment. In the ninth embodiment, a coaxial cable 107 functioning as the harness 5 is used instead of the twisted pair cable 7. In the present embodiment, the master communication apparatus 2 is electromagnetically connected with each of the slave communication apparatuses 3a, 3b, 3c by the coaxial cable 107. A core wire 107a and a coated wire 107b of the coaxial cable 107 are electrically connected with the master communication apparatus 2 and each of the slave communication apparatuses 3a, 3b, 3c. With this configuration, electric power supply and communication connection may be performed.

When the coaxial cable 107 is electrically connected to each of the slave communication apparatuses 3a, 3b, 3c, (i) as shown in FIG. 17, the connection may be implemented in a capacitive coupling manner (electric field coupling manner) corresponding to the frequency band of the power supply signal flowing through the coaxial cable 107, or (ii) as shown FIG. 18, the connection may be implemented in a magnetic field coupling manner by facing the openings of coils 38, 39 with each other corresponding to the frequency band of the power supply signal flowing through the coaxial cable 107. The configuration described in the present embodiment can provide advantages similar to the above-described embodiment.

(Other Embodiments)

The present disclosure should not be limited to the above embodiments and may be implemented in various other embodiments and combinations without departing from the scope of the present disclosure. For example, the power supply object circuit 22 shown in FIG. 12 and described in the fifth embodiment may be disposed in the master communication apparatus 2 (power feeding apparatus).

In the harness 5, the configuration in which the twisted pair cable 7 or the coaxial cable 107 is applied is described in the foregoing embodiments. Any configuration that is capable of performing power transmission may be applied to the harness 5. The above-described embodiments are applied to the power line power feeding system 1. Alternatively, the above-described embodiments may be applied to a data communication system which enables transmission of electric power supply. For example, the above-described embodiments may be applied to a wireless communication system performing the data communication in wireless manner. The master communication apparatus 2 may be configured to perform the data communication with the slave communication apparatuses 3a, 3b, 3c in non-contact manner. The terminal device 19 may be connected to another part of the harness 5 except the terminal portion. The bridge circuit 23 is not limited to a full wave rectifier circuit, and a half wave rectifier circuit may be used in the bridge circuit 23.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A terminal device, wherein the terminal device is configured in a system, the system includes a power feeding apparatus and a power receiving apparatus, the power receiving apparatus receives an electric power waveform from the power feeding apparatus through a harness, the power feeding apparatus supplies the power receiving apparatus with an electric power by coupling with the power receiving apparatus, and the coupling is conducted by a magnetic field through the harness or an electric field through the harness, the terminal device comprising:
a power conversion portion connected to a part of the harness; and
a control portion controlling a power conversion state of the power conversion portion,
wherein the control portion controls an input impedance of the power conversion portion to be equal to a characteristic impedance of the harness.

2. The terminal device according to claim 1, wherein the power conversion portion includes:
a bridge circuit connected to the harness and performing a full wave rectification;
a resistance voltage divider circuit detecting an output voltage of the bridge circuit; and
a current detection circuit detecting an output current flowing output from the bridge circuit, and
the control portion calculates the input impedance of the power conversion portion based on a detection result of the resistance voltage divider circuit and a detection result of the current detection circuit.

3. The terminal device according to claim 2, wherein the current detection circuit is provided by a shunt resistance that is connected to an output node of the bridge circuit in series.

4. The terminal device according to claim 2, wherein the current detection circuit is provided by a transformer that is connected to an output node of the bridge circuit in series.

5. The terminal device according to claim 1, wherein the power conversion portion includes:
a bridge circuit connected to the harness and performing a full wave rectification;
a resistance voltage divider circuit detecting an output voltage of the bridge circuit;
a coil connected to an output node of the bridge circuit;
a switching element switching a current flowing through the coil; and a diode allowing the current to pass in a single direction to a power supply object circuit after an electric power conversion, and the control portion controls the input impedance of the power conversion portion by switching on or switching off the switching element.

6. The terminal device according to claim 5, further comprising a current detection circuit detecting an output current flowing out from the bridge circuit, wherein the control portion switches on or switches off the switching element based on a detection result of the current detection circuit, and controls the current to continuously flow through the coil in a continuous conduction mode.

7. The terminal device according to claim 5, further comprising a current detection circuit detecting an output current flowing out from the bridge circuit, wherein the control portion switches on or switches off the switching element based on a detection result of the current detection circuit, and when the current detection circuit detects that the output current from the bridge circuit is equal to zero, the control portion switches on the switching element and controls an average current in a critical conduction mode.

8. The terminal device according to claim 1, further comprising a filter connected between the harness and the power conversion portion, the filter restricting a signal having a frequency identical to an operation frequency of the power conversion portion.

9. The terminal device according to claim 1, wherein the control portion controls the input impedance of the power conversion portion, and the power conversion portion supplies a converted electric power to a power supply object circuit.

10. The terminal device according to claim 9, wherein the power supply object circuit is disposed in the power feeding apparatus.

11. The terminal device according to claim 9, further comprising a first power supply apparatus, wherein the power conversion portion and the first power supply apparatus are interconnected.

12. The terminal device according to claim 9, further comprising:

a voltage detection portion detecting an output voltage of the power conversion portion or a voltage related to the output voltage of the power conversion portion; and a first power supply apparatus, wherein the first power supply apparatus supplies, to the power supply object circuit, a sum voltage of an output voltage of the first power supply apparatus and the output voltage of the power conversion portion, and the first power supply apparatus controls the sum voltage to be constant.

13. The terminal device according to claim 9, further comprising a voltage detection portion detecting an output voltage of the power conversion portion or a voltage related to the output voltage of the power conversion portion; and a voltage control portion, wherein the power feeding apparatus includes an AC driver functioning as the power supply object circuit, the AC driver outputs a signal through the harness based on a power source of a second power supply apparatus, and the voltage control portion supplies, to the AC driver, a sum voltage of an output voltage of the voltage detection portion and the output voltage of the second power supply apparatus, and the voltage control portion controls the sum voltage to be constant.

14. The terminal device according to claim 1, wherein the power feeding apparatus and the power receiving apparatus are configured to be capable of performing a data communication.

15. A wireless power feeding system comprising:

a power feeding apparatus;

a power receiving apparatus, wherein the power receiving apparatus receives an electric power waveform from the power feeding apparatus through a harness, the power feeding apparatus supplies the power receiving apparatus with an electric power by coupling with the power receiving apparatus, and the coupling is conducted by a magnetic field through the harness or an electric field through the harness; and a terminal device including:

a power conversion portion connected to a part of the harness; and a control portion controlling a power conversion state of the power conversion portion, wherein the control portion controls an input impedance of the power conversion portion to be equal to a characteristic impedance of the harness.

* * * * *